US012162722B2

(12) United States Patent
Depaola

(10) Patent No.: US 12,162,722 B2
(45) Date of Patent: Dec. 10, 2024

(54) WIRELESS EARLY CAR ARRIVAL FOR MOBILE INTERFACES TO ELEVATOR

(71) Applicant: Otis Elevator Company, Farmington, CT (US)

(72) Inventor: Peter Depaola, Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 131 days.

(21) Appl. No.: 17/728,127

(22) Filed: Apr. 25, 2022

(65) Prior Publication Data

US 2023/0339723 A1 Oct. 26, 2023

(51) Int. Cl.
*B66B 1/34* (2006.01)

(52) U.S. Cl.
CPC .... *B66B 1/3461* (2013.01); *B66B 2201/4638* (2013.01); *B66B 2201/4653* (2013.01)

(58) Field of Classification Search
CPC .......... B66B 1/3461; B66B 2201/4638; B66B 2201/4653; B66B 1/468
See application file for complete search history.

(56) References Cited

U.S. PATENT DOCUMENTS

| | | | | |
|---|---|---|---|---|
| 5,398,783 A * | 3/1995 | Jacoby | B66B 1/463 | 200/314 |
| 10,227,209 B2 * | 3/2019 | Collins | B66B 1/28 | |
| 2005/0279587 A1 * | 12/2005 | Bodmer | B66B 1/463 | 187/391 |
| 2009/0294221 A1 * | 12/2009 | Bahjat | B66B 1/468 | 187/396 |
| 2012/0048655 A1 * | 3/2012 | Hsu | B66B 1/468 | 187/247 |
| 2012/0253658 A1 * | 10/2012 | Kappeler | B66B 1/3415 | 701/410 |
| 2016/0221791 A1 * | 8/2016 | Berryhill | B66B 1/2458 | |
| 2017/0010099 A1 * | 1/2017 | Simcik | G01C 21/206 | |
| 2017/0260023 A1 * | 9/2017 | Zhang | B66B 3/002 | |
| 2017/0267487 A1 * | 9/2017 | Pasini | B66B 3/006 | |
| 2018/0118510 A1 * | 5/2018 | Simcik | G06F 3/0484 | |
| 2018/0162690 A1 * | 6/2018 | Hsu | B66B 3/002 | |
| 2018/0286100 A1 * | 10/2018 | Brothers | A63F 13/822 | |
| 2018/0327214 A1 * | 11/2018 | Armistead | G01C 21/206 | |
| 2019/0002237 A1 * | 1/2019 | Scoville | B66B 1/468 | |
| 2019/0308844 A1 * | 10/2019 | Kannan | B66B 1/28 | |
| 2020/0031612 A1 * | 1/2020 | Akkina | B66B 1/2458 | |
| 2020/0087108 A1 * | 3/2020 | Gireddy | B66B 1/468 | |
| 2022/0017327 A1 * | 1/2022 | Adifon | B66B 19/007 | |

FOREIGN PATENT DOCUMENTS

| | | |
|---|---|---|
| EP | 3381850 A1 | 10/2018 |
| EP | 3825271 A1 | 5/2021 |
| WO | 2009132696 A1 | 11/2009 |

OTHER PUBLICATIONS

European Search Report for Application No. 22208133.3, Issued Sep. 21, 2023, 7 Pages.

* cited by examiner

*Primary Examiner* — Nay Tun
(74) *Attorney, Agent, or Firm* — CANTOR COLBURN LLP

(57) ABSTRACT

A method of providing elevator data to a passenger including: receiving elevator data, the elevator data relating to an elevator car in an elevator system; wirelessly transmitting the elevator data to a mobile computing device; and conveying the elevator data to the passenger via a software application of the mobile computer device.

14 Claims, 3 Drawing Sheets

WIRELESS EARLY CAR ARRIVAL FOR MOBILE INTERFACES TO ELEVATOR

BACKGROUND

The subject matter disclosed herein relates generally to the field of elevator systems, and specifically to a method and apparatus for notifying passengers of elevator car arrival.

Elevator systems are typically only able to inform passengers of an elevator car's arrival at a boarding floor via light up indicators located near an elevator car. This offers limited information to a passenger about when the elevator car may arrive. A chime may occur when the elevator car is approaching but the passenger may not recognize if the elevator chime is for the car that they intend to board.

BRIEF SUMMARY

According to an embodiment, a method of providing elevator data to a passenger is provided. The method including: receiving elevator data, the elevator data relating to an elevator car in an elevator system; wirelessly transmitting the elevator data to a mobile computing device; and conveying the elevator data to the passenger via a software application of the mobile computer device.

In addition to one or more of the features described herein, or as an alternative, further embodiments may include that the receiving elevator data further includes: receiving elevator data being transmitted to a hall lantern.

In addition to one or more of the features described herein, or as an alternative, further embodiments may include that the receiving elevator data further includes: receiving elevator data being transmitted from a dispatcher or a controller of the elevator system.

In addition to one or more of the features described herein, or as an alternative, further embodiments may include that the elevator data includes an arrival time of the elevator car at a landing where the passenger is located or an elevator car approaching message.

In addition to one or more of the features described herein, or as an alternative, further embodiments may include that the elevator data includes a time remaining until an arrival time of the elevator car at a landing where the passenger is located.

In addition to one or more of the features described herein, or as an alternative, further embodiments may include that wirelessly transmitting the elevator data to the mobile computing device further includes: wirelessly transmitting the elevator data to the mobile computing device via a short-range wireless protocol.

In addition to one or more of the features described herein, or as an alternative, further embodiments may include that the conveying the elevator data to the passenger via the software application of the mobile computer device further includes: displaying the elevator data on a display device of the mobile computing device.

In addition to one or more of the features described herein, or as an alternative, further embodiments may include that the conveying the elevator data to the passenger via the software application of the mobile computer device further includes: audibly emitting the elevator data via a feedback device of the mobile computing device.

According to another embodiment, a wireless module for providing elevator data to a passenger is provided. The wireless module including: a processor; and a memory including computer-executable instructions that, when executed by the processor, cause the processor to perform operations. The operations including: receiving the elevator data, the elevator data relating to an elevator car in an elevator system; wirelessly transmitting the elevator data to a mobile computing device; and conveying the elevator data to the passenger via a software application of the mobile computer device.

In addition to one or more of the features described herein, or as an alternative, further embodiments may include that the receiving elevator data further includes: receiving elevator data being transmitted to a hall lantern.

In addition to one or more of the features described herein, or as an alternative, further embodiments may include that the receiving elevator data further includes: receiving elevator data being transmitted from a dispatcher or a controller of the elevator system.

In addition to one or more of the features described herein, or as an alternative, further embodiments may include that the elevator data includes an arrival time of the elevator car at a landing where the passenger is located or an elevator car approaching message.

In addition to one or more of the features described herein, or as an alternative, further embodiments may include that the elevator data includes a time remaining until an arrival time of the elevator car at a landing where the passenger is located.

In addition to one or more of the features described herein, or as an alternative, further embodiments may include that wirelessly transmitting the elevator data to the mobile computing device further includes: wirelessly transmitting the elevator data to the mobile computing device via a short-range wireless protocol.

According to another embodiment, a computer program product embodied on a non-transitory computer readable medium is provided. The computer program product including instructions that, when executed by a processor, cause the processor to perform operations including: receiving elevator data, the elevator data relating to an elevator car in an elevator system; wirelessly transmitting the elevator data to a mobile computing device; and conveying the elevator data to the passenger via a software application of the mobile computer device.

In addition to one or more of the features described herein, or as an alternative, further embodiments may include that the receiving elevator data further includes: receiving elevator data being transmitted to a hall lantern.

In addition to one or more of the features described herein, or as an alternative, further embodiments may include that the receiving elevator data further includes: receiving elevator data being transmitted from a dispatcher or a controller of the elevator system.

In addition to one or more of the features described herein, or as an alternative, further embodiments may include that the elevator data includes an arrival time of the elevator car at a landing where the passenger is located or an elevator car approaching message.

In addition to one or more of the features described herein, or as an alternative, further embodiments may include that the elevator data includes a time remaining until an arrival time of the elevator car at a landing where the passenger is located.

In addition to one or more of the features described herein, or as an alternative, further embodiments may include that wirelessly transmitting the elevator data to the mobile computing device further includes: wirelessly transmitting the elevator data to the mobile computing device via a short-range wireless protocol.

Technical effects of embodiments of the present disclosure include utilizing elevator data already being transmitted to hall lanterns of elevator systems and relaying that elevator data wirelessly to mobile devices, optionally with additional information, to better inform passengers of the arrival time of an elevator car.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Elevator systems are typically only able to inform passengers of an elevator car's arrival at a boarding floor via light up indicators located near an elevator lobby. This offers limited information to a passenger about when the elevator car may arrive. A chime may occur when the elevator car is approaching but the passenger may not recognize if the elevator chime is for the car that they intend to board. Thus more information for the passenger is greatly desired.

The embodiments disclosed herein relate to a system and a method of wirelessly connecting the light up indicators located near or proximate the elevator lobby to a mobile device of an individual to provide the individual with more information about the arrival of the elevator car.

Figure 1:
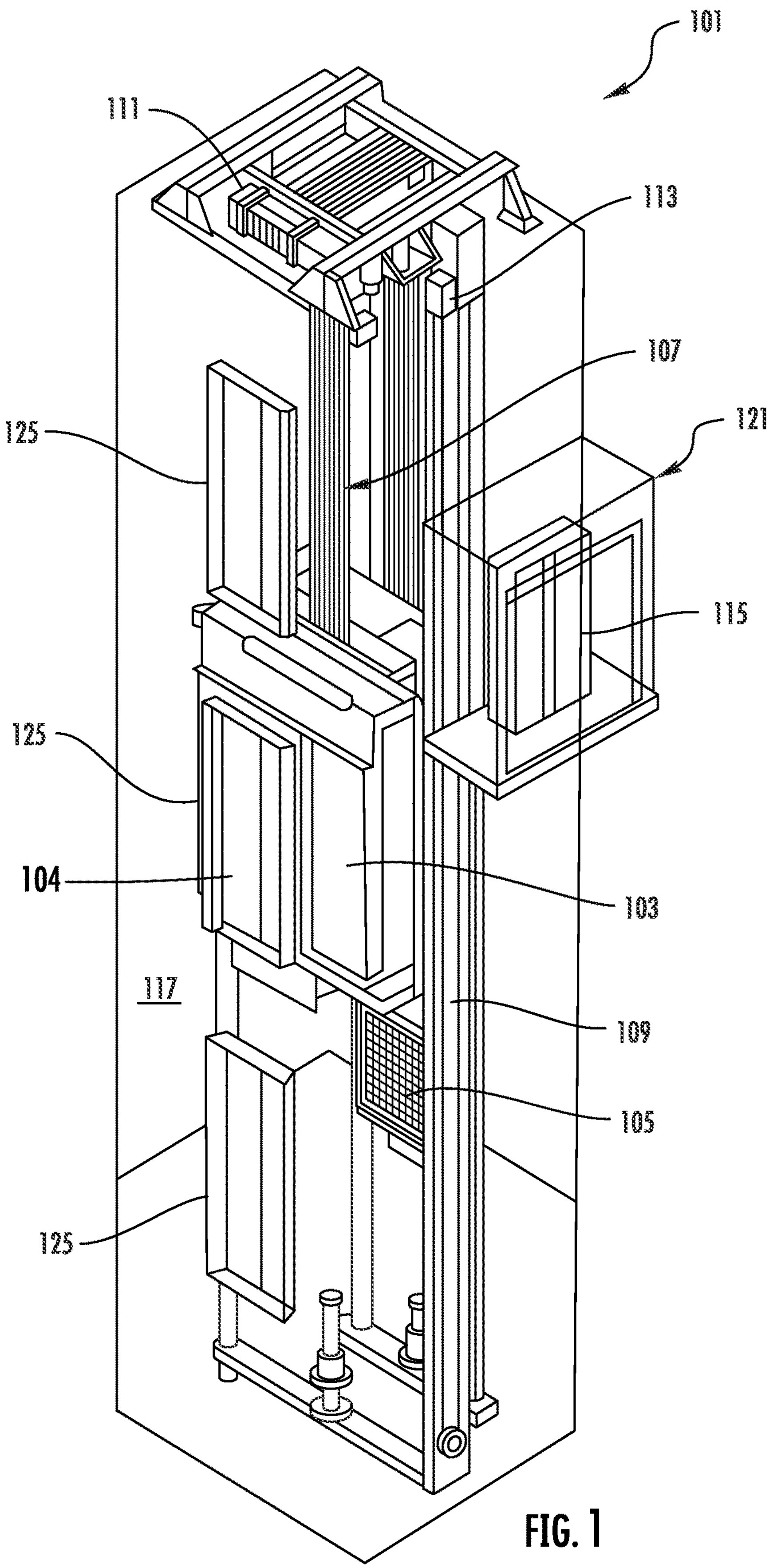
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counterweight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor or pinched wheel propulsion to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

The elevator system 101 also includes one or more elevator doors 104. The elevator door 104 may be integrally attached to the elevator car 103. There may also be an elevator door 104 located on a landing 125 of the elevator system 101 (see FIG. 2).

Figure 2:
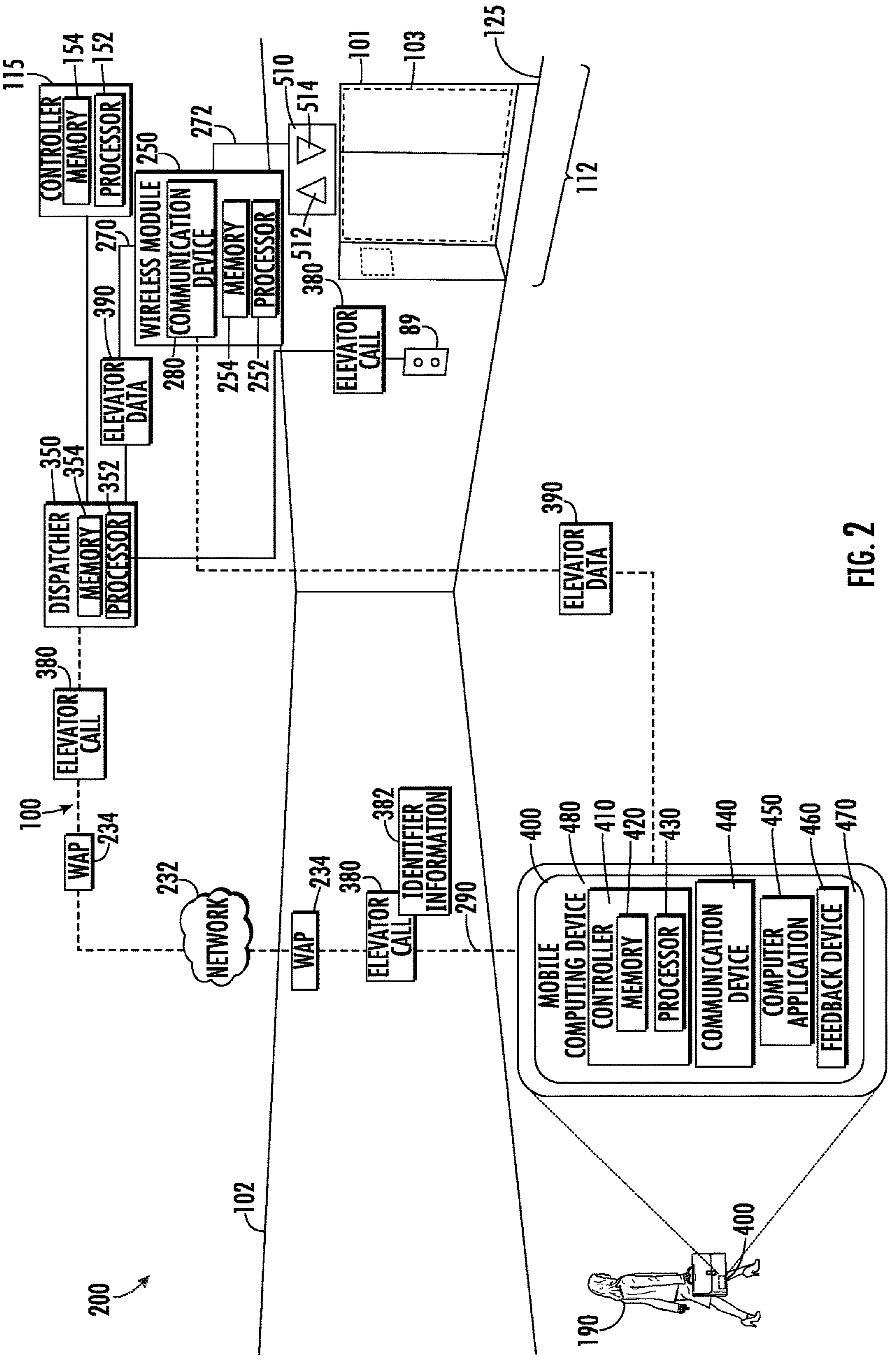
FIG. 2 illustrates a schematic view of an elevator call system, in accordance with an embodiment of the disclosure.

Referring now to FIG. 2, with continued reference to FIG. 1, an elevator call system 200 is illustrated, in accordance with an embodiment of the present disclosure. It should be appreciated that, although particular systems are separately defined in the schematic block diagrams, each or any of the systems may be otherwise combined or separated via hardware and/or software.

The elevator call system 200 may include a hall lantern 510 located proximate the elevator system 101 at the elevator bank 112. The hall lantern 510 may include an up signal 512 configured to illuminate when an elevator car 103 is approaching or is at the landing 125, and will then be moving in the up direction when leaving the landing 125. The hall lantern 510 may include a down signal 514 configured to illuminate when an elevator car 103 is approaching or is at the landing 125, and will then be moving in the down direction when leaving the landing 125. The hall lantern 510 may illuminate, change color, strobe, make an audible sound (e.g., chime, ding) or take another action to alert the passenger 190 that an elevator car 103 is arriving.

As illustrated in FIG. 2, a building elevator system 100 within a building 102 may include one or more individual elevator systems 101 organized in elevator banks 112 on a landings 125 (i.e., floor of the building 102). It is understood that while a single elevator system 101 is illustrated in a single elevator bank 112, the elevator bank 112 may comprise any number of elevator systems 101 and there may be one or more elevator banks 112. The elevator system 101 illustrated in FIG. 2 may be a single deck elevator system (e.g., one elevator car) or a double-deck elevator system. The elevator system 101 of FIG. 2 includes an elevator car 103. The elevator car 103 may serve any number of landings 125.

The landing 125 in the building 102 of FIG. 2 may have an elevator call device 89 located proximate the elevator system 101. The elevator call device 89 is configured to transmit an elevator call 380 to a dispatcher 350 of the building elevator system 100. It should be appreciated that, although the dispatcher 350 is separately defined in the schematic block diagrams, the dispatcher 350 may be combined via hardware and/or software in the controller 115 or any other device. The elevator call 380 may include the source of the elevator call 380. The elevator call device 89 may include a destination entry option that includes the destination of the elevator call 380. The elevator call device 89 may be a push button and/or a touch screen and may be activated manually or automatically. For example, the elevator call 380 may be sent by the passenger 190.

A mobile computing device 400 may also be configured to transmit an elevator call 380 and the passenger 190 may be in possession of said mobile computing device 400 to transmit the elevator call 380. The mobile computing device 400 may belong to the passenger 190, such as, for example, a passenger or potential passenger of the elevator system 101. The passenger 190 may utilize a software application 450 through a mobile computing device 400 to make an elevator call 380 or an elevator call 380 may be made automatically by the software application 450. The elevator call 380 sent from the software application 450 may include identifier information 382 that indicates what mobile computing device 400 and/or passenger 190 has transmitted the elevator call 380. The software application 450 may be installed on the mobile computing device 400 or accessed via the network 232, internet, or some other known portal through the mobile computing device 400, such as, for example a software-as-a service.

The mobile computing device 400 may be a mobile computing device that is typically carried by a person, such as, for example a phone, a smart phone, a PDA, a smart watch, a tablet, a laptop, or any other mobile computing device known to one of skill in the art. In an embodiment, the mobile computing device 400 is a smart phone.

The mobile computing device 400 includes a controller 410 configured to control operations of the mobile computing device 400. The controller 410 may be an electronic controller including a processor 430 and an associated memory 420 comprising computer-executable instructions (i.e., computer program product) that, when executed by the processor 430, cause the processor 430 to perform various operations. The processor 430 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 420 may be but is not limited to a random access memory (RAM), read only memory (ROM), or other electronic, optical, magnetic or any other computer readable medium.

The mobile computing device 400 includes a communication device 440 configured to communicate with the WAP 234 or a wireless module 250 through one or more wireless signals. The one or more wireless signals may include Bluetooth, BLE, Wi-Fi, HaLow (801.11ah), zWave, ZigBee, ultra-wideband, Wireless M-Bus, cellular, or any other short-range wireless protocol known to one of skill in the art.

The mobile computing device 400 may include a display device 480, such as for example a computer display, an LCD display, an LED display, an OLED display, a touchscreen of a smart phone, or any other similar display device known to one of the skill in the art. The passenger 190 operating the mobile computing device 400 is able to view the software application 450 through the display device 480.

The mobile computing device 400 includes an input device 470 configured to receive a manual input from the passenger 190 (e.g., human being) of mobile computing device 400. The input device 470 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the mobile computing device 400, or any similar input device known to one of skill in the art. The passenger 190 operating the mobile computing device 400 is able to enter feedback into the software application 450 through the input device 470. The input device 470 allows the passenger 190 operating the mobile computing device 400 to enter feedback into the software application 450 via a manual input to input device 470. For example, the passenger 190 may respond to a prompt on the display device 480 by entering a manual input via the input device 470. In one example, the manual input may be a touch on the touchscreen or a voice command into the microphone. In an embodiment, the display device 480 and the input device 470 may be combined into a single device, such as, for example, a touchscreen. There may be more than one input devices 470, such as, for example, a touchscreen, a microphone, and/or a physical button.

The mobile computing device 400 may also include a feedback device 460. The feedback device 460 may activate in response to a manual input via the input device 470. The feedback device 460 may be a haptic feedback vibration device and/or a speaker emitting a sound. The feedback device 460 may activate to confirm that the manual input entered via the input device 470 was received via the software application 450. For example, the feedback device 460 may activate by emitting an audible sound or vibrate the mobile computing device 400 to confirm that the manual input entered via the input device 470 was received via the software application 450.

The passenger 190 may enter the elevator call 380 using a keypad, physical button, or touchscreen of the mobile computing device 400. The display device 480 may also act as a touch screen. The passenger 190 may also enter the elevator call 380 via a voice command that is received by a microphone of the mobile computing device 400.

The controller 115 is configured to control and coordinate operation of an elevator system 101. The controller 115 may be an electronic controller including a processor 152 and an associated memory 154 comprising computer-executable instructions that, when executed by the processor 152, cause the processor 152 to perform various operations. The processor 152 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 154 may be but is not limited to a random access memory (RAM), read only memory (ROM), or other electronic, optical, magnetic or any other computer readable medium.

The dispatcher 350 is configured to control and coordinate operation of one or more elevator systems 101 in one or more elevator banks 112. The dispatcher 350 may be an electronic controller including a processor 352 and an associated memory 354 comprising computer-executable instructions that, when executed by the processor 352, cause the processor 352 to perform various operations. The processor 352 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 354 may be but is not limited to a random access memory (RAM), read only memory (ROM), or other electronic, optical, magnetic or any other computer readable medium.

The controller 115 can be local, remote, cloud, etc. The dispatcher 350 may be local, remote, cloud, etc. The dispatcher 350 is in communication with the controller 115 of each elevator system 101. The dispatcher 350 may be a 'group' software that is configured to control the elevator system 101.

The dispatcher 350 is in communication with the elevator call device 89 of the building elevator system 100. The dispatcher 350 is configured to receive the elevator call 380 transmitted from the elevator call device 89, wireless module 250, and/or the mobile computing device 400. The dispatcher 350 is configured to manage the elevators calls 380 coming in from the elevator call device 89, wireless module 250, and/or the mobile computing device 400 then command one or more elevator systems 101 to respond to elevator call 380.

The wireless module 250 may be configured to transmit a wireless signal 290 from a communication device 280 using short-range wireless protocols. Short-range wireless protocols may include, but not are limited to, Bluetooth, BLE, Wi-Fi, HaLow (801.11ah), zWave, ZigBee, Wireless M-Bus ultra-wideband, Wireless M-Bus, or any other short-range wireless protocol known to one of skill in the art. In an embodiment, the wireless signal 290 is a Bluetooth wireless signal. The wireless signal 290 may be transmitted from the communication device 280 and include the elevator data 390.

The wireless module 250 includes a processor 252 and an associated memory 254 including computer-executable instructions that, when executed by the processor 252, cause the processor 252 to perform various operations. The processor 252 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 254 may be a storage device such as, for example, a random access memory (RAM), read only memory (ROM), or other electronic, optical, magnetic or any other computer readable medium.

The wireless module 250 includes a communication device 280 configured to allow the wireless module 250 emit the wireless signal 290. The beacon may also be capable of communicating with the dispatcher 350 or the controller 115. The communication device 280 is capable of transmitting and receiving data to and from the dispatcher 350 through the wired communication line 270.

The communication device 280 is configured to communicate with the mobile computing device 400 using short-range wireless protocols. The short-range wireless protocols may be Bluetooth, BLE, Wi-Fi, HaLow (801.11ah), zWave, ZigBee, ultra-wideband, Wireless M-Bus, cellular, or any other short-range wireless protocol. The communication device 280 may also be configured communicate with the mobile computing device 400 through the WAP 234 or any other desired short-range wireless protocol.

The hall lantern 510 is in communication with the dispatcher 350 and/or the controller 115. The hall lantern 510 may be in communication with the dispatcher 350 and/or the controller 115 through a wireless module 250 or may be in communication with the dispatcher directly. Elevator data 390 received by the hall lantern 510 from the dispatcher 350 or the controller 115 may be transmitted through the wireless module 250 to the hall lantern 510 or transmitted simultaneously to both the hall lantern 510 and the wireless module 250. The communication between the wireless module 250 and the dispatcher 350 and/or the controller 115 may be through a wired communication line 270. The communication between the wireless module 250 and the hall lantern 510 and/or the controller 115 may be through a wired communication line 272. The elevator data 390 may include a current location of the elevator car 103, a time that the elevator car 103 will arrive at the landing 125, a time until the elevator car 103 arrives at the landing 125, a door opening, and/or a "when approaching destination floor notification".

Conventionally the wireless module 270 does not exist in elevator systems 101 and the hall lantern 510 is directly connected to the dispatcher 350 and/or the controller 115. The addition of the wireless module 270 allows the elevator data 390 that was always being sent to the hall lantern 510 to be wirelessly transmitted out to a mobile computing device 400 that the passenger 190 may receive the elevator data 390 directly, as further described herein. The elevator data 390 may be readily understandable by a software application 450 on the mobile computing device 400. Alternatively, the elevator data 390 may be readily translatable by the software application 450 or the network 232. For example, the elevator data 390 may be a data string that the software application 450 translates or sends to the network 232 to translate into understandable location information. The computer network 232 may be a cloud computing network or the internet.

The software application 450 is configured to provide the elevator data 390 to the passenger 190 via the mobile computing device 400. The software application 450 may be able to display the elevator data 390 via the display device 480 of the mobile computing device 400. The software application 450 may be able to audibly emit the elevator data 390 via the feedback device 460 (e.g., speaker) of the mobile computing device 400. In one example, the elevator data 390 may be a time of arrival of the elevator car 103 at the landing 125 or a time until the elevator car 103 arrives at the landing 125. Advantageously, this will help the passenger better predict when the elevator car 103 will arrive.

Figure 3:
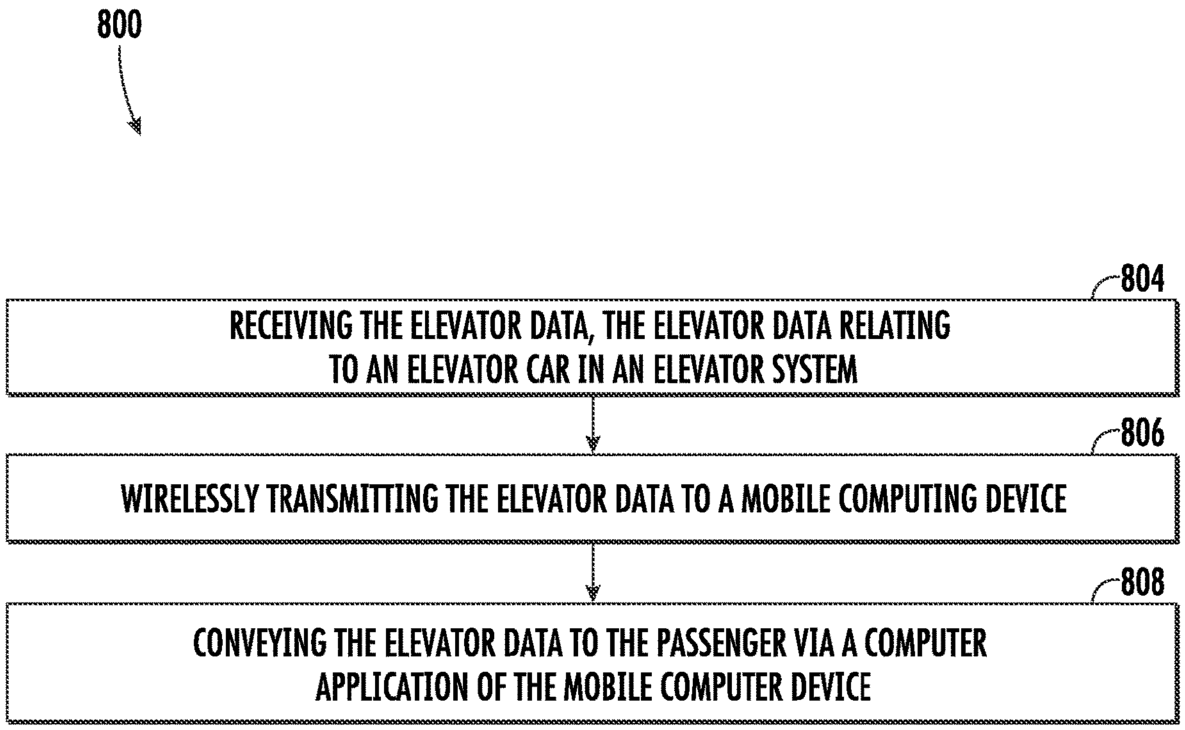
FIG. 3 is a flow chart of method of providing elevator data to a passenger, in accordance with an embodiment of the disclosure.

Referring now to FIG. 3, while referencing components of FIGS. 1-2. FIG. 3 shows a flow chart of method 800 of providing elevator data 390 to a passenger 190, in accordance with an embodiment of the disclosure. In an embodiment, the method 800 is performed by the beacon calibration system 500 of FIG. 2. In an embodiment, the method 800 is performed by the calibration application 650 of FIG. 3.

At block 804, the elevator data 390 is received. The elevator data 390 relating to an elevator car 103 in an elevator system 101. The elevator data 390 may have been being transmitted to a hall lantern 510. The elevator data 390 may have been transmitted from a dispatcher 350 and/or the controller 115 of the elevator system 101. In an embodiment, the elevator data 390 includes an arrival time of the elevator car 103 at a landing 125 where the passenger 190 is located or an elevator car approaching message. The elevator data 390 may include other elements, such as a count down to arrival of the elevator car 103, a "car approaching" message, a door opening message, etc.

In an embodiment, the elevator data 390 includes a time remaining until an arrival time of the elevator car 103 at a landing 123 where the passenger 190 is located.

At block 806, the elevator data 390 is wirelessly transmitted to a mobile computing device 400. The elevator data 390 may be wirelessly transmitted to the mobile computing device 400 via Bluetooth, BLE, Wi-Fi, HaLow (801.11ah), zWave, ZigBee, ultra-wideband, Wireless M-Bus, cellular, or any other short-range wireless protocol.

At block 808, the elevator data 390 is conveyed to the passenger 190 via a software application 450 of the mobile computer device 400.

In an embodiment, the elevator data 390 is conveyed to the passenger 190 by displaying the elevator data 390 on a display device 480 of the mobile computing device 400. In an embodiment, the elevator data 390 is conveyed to the passenger 190 by audibly emitting the elevator data 390 via a feedback device 460 of the mobile computing device 400. The feedback device 460 may be a speaker.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of providing elevator data to a passenger, the method comprising:

receiving elevator data, the elevator data relating to an elevator car in an elevator system;

wirelessly transmitting the elevator data to a mobile computing device; and conveying the elevator data to the passenger waiting to board the elevator car via a software application of the mobile computer device;

wherein the elevator data includes an arrival time of the elevator car at a landing where the passenger is located;

wherein the receiving elevator data further comprises receiving elevator data being transmitted to a hall lantern;

wherein the elevator data being transmitted to the hall lantern is the same elevator data conveyed to the mobile computer device.

2. The method of claim 1, wherein the receiving elevator data further comprises:

receiving elevator data being transmitted from a dispatcher or a controller of the elevator system.

3. The method of claim 1, wherein the arrival time includes a time remaining until the elevator car arrives at the landing where the passenger is located.

4. The method of claim 1, wherein wirelessly transmitting the elevator data to the mobile computing device further comprises:

wirelessly transmitting the elevator data to the mobile computing device via a short-range wireless protocol.

5. The method of claim 1, wherein the conveying the elevator data to the passenger via the software application of the mobile computer device further comprises:

displaying the elevator data on a display device of the mobile computing device.

6. The method of claim 1, wherein the conveying the elevator data to the passenger via the software application of the mobile computer device further comprises:

audibly emitting the elevator data via a feedback device of the mobile computing device.

7. A wireless module for providing elevator data to a passenger, the wireless module comprising:

a processor; and a memory comprising computer-executable instructions that, when executed by the processor, cause the processor to perform operations, the operations comprising:

receiving the elevator data, the elevator data relating to an elevator car in an elevator system;

wirelessly transmitting the elevator data to a mobile computing device; and conveying the elevator data to the passenger waiting to board the elevator car via a software application of the mobile computer device;

wherein the elevator data includes an arrival time of the elevator car at a landing where the passenger is located or an elevator car approaching message;

wherein the receiving elevator data further comprises receiving elevator data being transmitted to a hall lantern;

wherein the elevator data transmitted to the hall lantern is the same elevator data conveyed to the mobile computer device.

8. The wireless module of claim 7, wherein the receiving elevator data further comprises:

receiving elevator data being transmitted from a dispatcher or a controller of the elevator system.

9. The wireless module of claim 7, wherein the arrival time includes a time remaining until the elevator car arrives at the landing where the passenger is located.

10. The wireless module of claim 7, wherein wirelessly transmitting the elevator data to the mobile computing device further comprises:

wirelessly transmitting the elevator data to the mobile computing device via a short-range wireless protocol.

11. A computer program product embodied on a non-transitory computer readable medium, the computer program product including instructions that, when executed by a processor, cause the processor to perform operations comprising:

receiving elevator data, the elevator data relating to an elevator car in an elevator system;

wirelessly transmitting the elevator data to a mobile computing device; and conveying the elevator data to the passenger waiting to board the elevator car via a software application of the mobile computer device;

wherein the elevator data includes an arrival time of the elevator car at a landing where the passenger is located;

wherein the receiving elevator data further comprises receiving elevator data being transmitted to a hall lantern;

wherein the elevator data being transmitted to the hall lantern is the same elevator data conveyed to the mobile computer device.

12. The computer program product of claim 11, wherein the receiving elevator data further comprises:

receiving elevator data being transmitted from a dispatcher or a controller of the elevator system.

13. The computer program product of claim 11, wherein the arrival time includes a time remaining until the elevator car arrives at the landing where the passenger is located.

14. The computer program product of claim 11, wherein wirelessly transmitting the elevator data to the mobile computing device further comprises:

wirelessly transmitting the elevator data to the mobile computing device via a short-range wireless protocol.

* * * * *